United States Patent [19]

Schovee

[11] 4,391,054
[45] Jul. 5, 1983

[54] METHOD, APPARATUS AND ARTICLE FOR FORMING A PICTURE FRAME

[76] Inventor: John R. Schovee, 10 Burr Oak Dr., Pittsford, N.Y. 14534

[21] Appl. No.: 193,809

[22] Filed: Oct. 3, 1980

[51] Int. Cl.³ .................... A47G 1/06; B32B 31/18
[52] U.S. Cl. ................................ 40/154; 40/156; 40/155; 52/656; 403/401; 156/73.1; 156/73.3
[58] Field of Search ............... 40/152, 152.1, 152.2, 40/156, 158 R, 157, 155, 600; 52/656; 156/73.1, 73.3; 228/1 R, 1 A, 1 B, 110; 403/295, 401

[56] References Cited

U.S. PATENT DOCUMENTS

| | | | |
|---|---|---|---|
| 1,702,626 | 2/1929 | Beyrle | 40/152 |
| 1,863,995 | 6/1932 | Ponstingl | 46/25 |
| 2,083,354 | 6/1937 | Whittier | 40/152 |
| 2,161,396 | 6/1939 | Wittel | 40/152 |
| 2,255,151 | 9/1941 | Clements | 403/401 |
| 2,392,734 | 1/1946 | Haberstump | 40/152 |
| 2,581,843 | 1/1952 | Edwards | 40/156 |
| 2,589,729 | 3/1952 | Rates | 40/152 |
| 2,601,734 | 7/1952 | Couzinet | 40/156 |
| 2,695,470 | 11/1954 | Rosenburg et al. | 40/152 |
| 3,648,393 | 3/1972 | Parrilla | 40/152 |
| 3,673,674 | 7/1972 | Catulle | 403/401 |
| 4,090,799 | 5/1978 | Crotti et al. | 40/152 |
| 4,207,697 | 6/1980 | Murphy | 40/600 |
| 4,224,091 | 9/1980 | Soger | 40/152 |
| 4,261,122 | 4/1981 | Le Vine | 40/152 |

*Primary Examiner*—Robert Peshock
*Assistant Examiner*—Michael J. Foycik
*Attorney, Agent, or Firm*—Schovee, Boston & Greenwald

[57] ABSTRACT

Method and apparatus and article for forming picture frames and molding and the picture frame and molding made thereby, wherein the picture frame molding includes a fusible strip running the entire length thereof and wherein the abutting sections of molding at the corners of the frame are held together by the abutting fusible strips being fused together at the corners. The frame is preferably wood and the fusible strip is preferably a thermoplastic material that can be fused to itself by for example ultrasonic welding. Also, the dust cover or backing for the picture is fusible to the back of the picture frame sections.

31 Claims, 9 Drawing Figures

METHOD, APPARATUS AND ARTICLE FOR FORMING A PICTURE FRAME

BACKGROUND OF THE INVENTION

1. Field of the Invention

This invention relates to picture framing and particularly to improved methods, apparatus and articles for use in picture framing.

2. Description of the Prior Art

Generally the prior art method used to produce a picture frame from wood is to cut the molding with the proper length and with 45° metered corners, to then hold two mating and abutting mitered ends, in contact, drill one or more holes through the abutting pieces, nail one or more nails through the holes countersink the nails, place an amount of putty in the recessed nail holes, and often times glue is also inserted between the opposing mitered surfaces. Each corner is joined in this same manner.

In attempts to overcome the problems of such prior art picture frames, a variety of solutions have been attempted such as a slot and a wedge across the mitered corners (U.S. Pat. No. 3,336,689), and an elastic band embracing the frame (U.S. Pat. No. 2,826,843). But, basically picture frames are still commercially made by the nailing method.

It is a primary object of the present invention to provide improved picture framing methods, apparatus and articles, which are more economical, faster, easier and simpler than the prior art.

SUMMARY OF THE INVENTION

One of the purposes of the present invention is to provide a picture frame and molding comprised primarily of wood, containing a continuous strip of fusible plastic forming an inner plastic frame running the entire length of each frame section. The cross-sectional shape of the groove that said fusible strip of plastic lies in is of such a shape that said plastic strip is keyed in the groove.

One object of this invention, relative to the wood frame, is to provide a method and apparatus which enables the formation of a secure 45° mitered corner without additional drilling, or use of nails. Instead, an ultrasonic fuser will fuse the mitered ends of the thermoplastic strips to secure the mitered corners.

One object is to provide method and apparatus which provides picture frames a method of construction for making frames, which will make picture framing more economical, faster, easier and simpler than previous methods.

Additional objects and features of this invention will appear from the following description in which the preferred embodiment is set forth in conjunction with the accompanying drawing.

DETAILED DESCRIPTION OF THE PREFERRED EMBODIMENT

Figure 1:
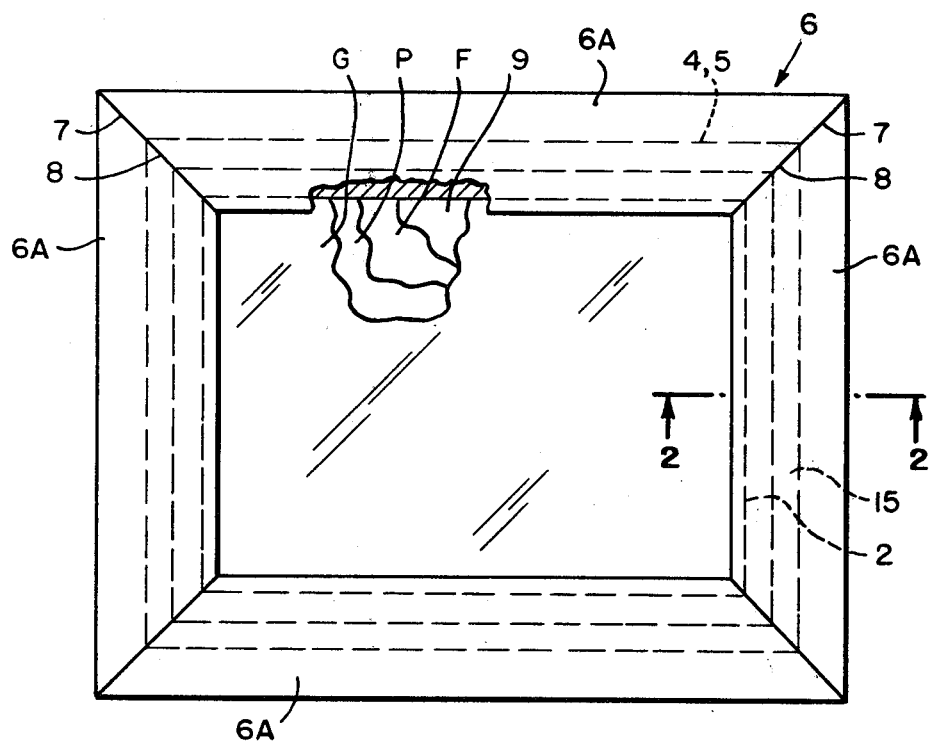
FIG. 1 is a plan view of the face of a picture frame incorporating the present invention.

The picture frame shown in FIG. 1 provides a frame 6 consisting of four frame sections or members 6A which are molding strips consisting primarily of wood molding or other suitable material and secondarily having a thermoplastic strip 5 incorporated therein. The thermoplastic strips 5 may be any suitable material which can be ultrasonically or otherwise fused to itself, for example, unsaturated polyesters, polyamides, and the like. The plastic strip 5 is keyed in a groove 4 on the back of the wood frame section 6A. The mitered corners 7, are held fast by a fused plastic joint 8 made in accordance with this invention.

In the FIG. 1 embodiment, the picture P, the glass G, and the picture filler F are prevented from moving laterally or longitudinally by the frame 6, preferably wood. Each piece of molding is rigid with respect to the other molding pieces. The frame is held rigid by the interconnected fused continuous plastic strips 5 defining a continuous plastic inner frame 15 that is keyed to the frame 6 by the groove 4 and fused at the corner joints 8. This results in a rigid picture frame without the use of nails and provides the continuous plastic inner frame 15 comprising the fused plastic strips 5 extending around and holding the adjacent frame sections 6A in rigid permanent relationship. It will be understood that each thermoplastic strip 5 can be any one of a number of suitable polyethers or nylons or any other composition suitable for fulfilling the requirements of this invention.

In the FIGS. 2a-d embodiment, there is a groove 2 cut out of the inside of the frame 6. The groove 2 locates and holds the glass 6, the picture P and the cardboard filler F in the frame. The plastic strip 5 is keyed in the groove 4 so that the plastic strip 5 cannot be removed from the wood frame 6 after the corner joints 8 are fused. A dust cover or backing material 9 completely covers the back of the picture filler F and preferably extends across and interface with the plastic strip 5. If said dust cover 9 is of a paper material it is to be attached to the frame by tacks or glue. If said dust cover 9 is of a thermoplastic material or paper board or other suitable material which has thermoplastic material impregnated in it, then it may be fused to the thermoplastic strips 5 by means of ultrasonic or other means of applying heat sufficient to fuse and join with strips 5. It is preferable to provide a thick and/or strong dust cover 9 with this invention so it will be strong enough to support the glass 6, picture P and backing B in engaging relationship with the forward edge of the groove 2.

Figure 2A:
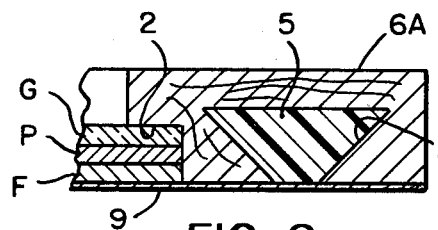
FIGS. 2a-d are enlarged alternative cross-sectional views taken along the line 2—2 of FIG. 1.

The alternative cross-sectional FIGS. 2a-d of the plastic strip(s) 5 which form a continuous fused strip around and securing the frame members 6A consist of the four following alternative constructions:

In the FIG. 2a embodiment, there is a single plastic strip that is trapezoidal in cross-section.

Figure 2B:
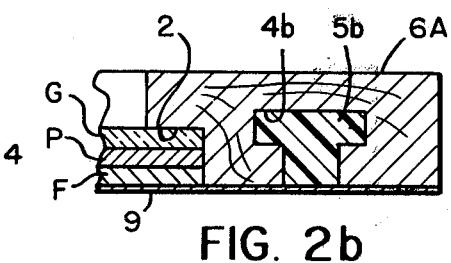

In the FIG. 2b embodiment, there is a single plastic strip that is "T"-shaped in cross-section.

Figure 2C:
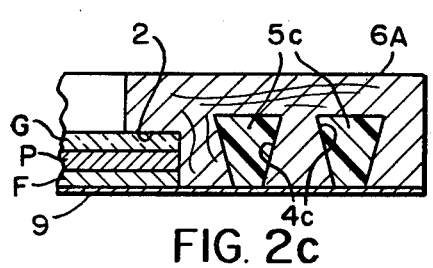

In the FIG. 2c embodiment, there are a plurality of plastic strips that are trapezoidal in cross-section.

Figure 2D:
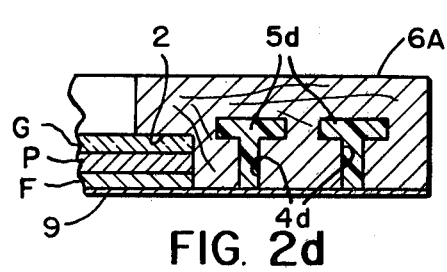

In the FIG. 2d embodiment, there are a plurality of plastic strips that are "T"-shaped in cross-section.

Figure 3:
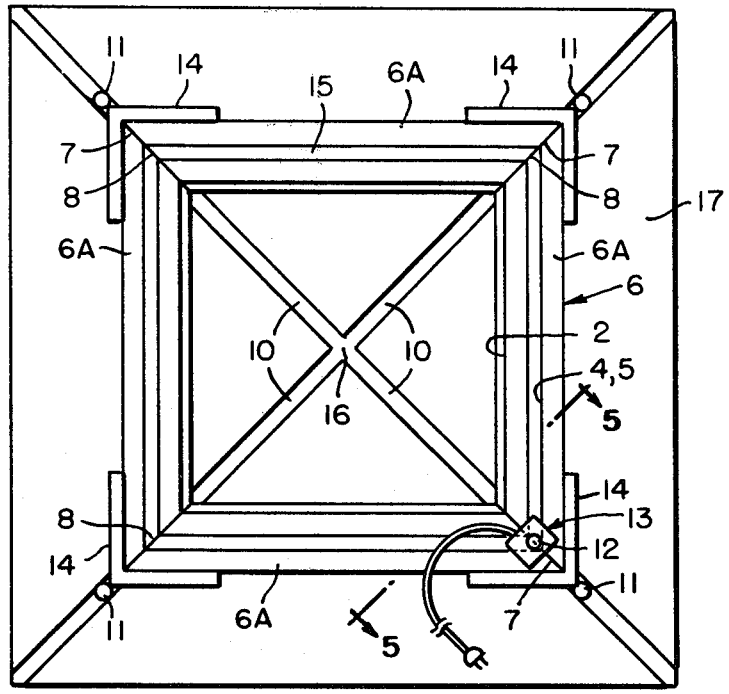
FIG. 3 is a plan view of the back of a picture frame incorporating the present invention being held in a table top vice which aids in the fusing of the molding.
Figure 4:
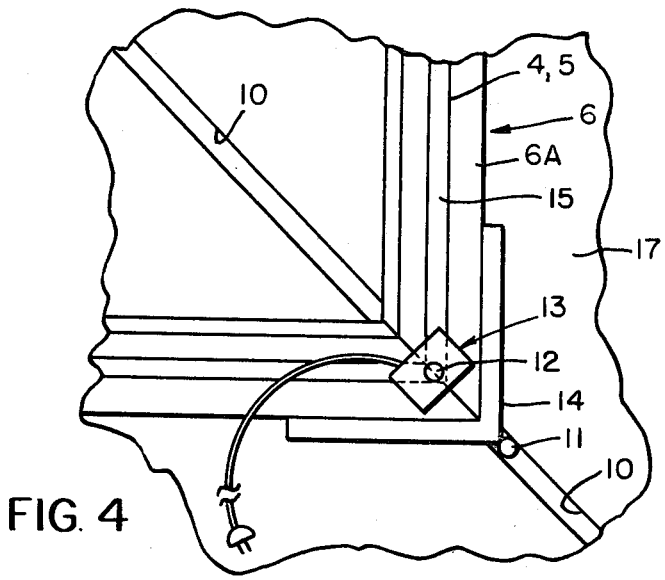
FIG. 4 is an enlarged fractional plan view.
Figure 5:
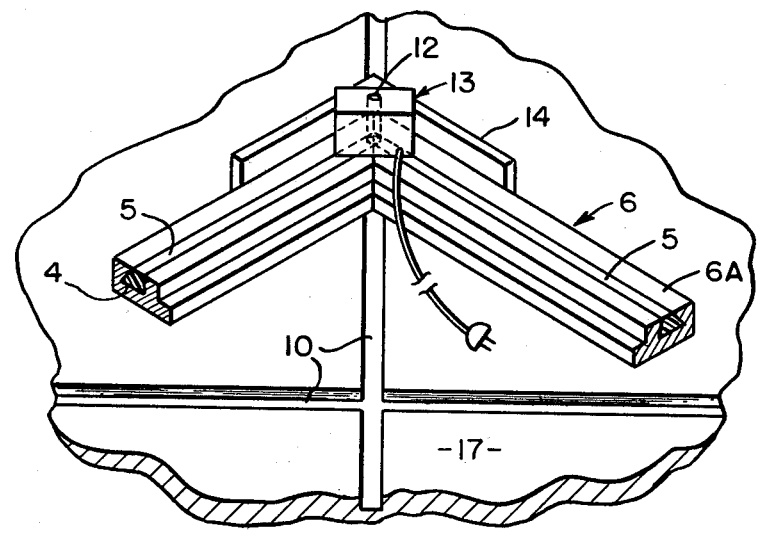
FIG. 5 is an enlarged, broken away perspective view taken substantially along the line 5—5 of the frame in FIG. 3.

In the FIGS. 3, 4, and 5 embodiment, I have provided an apparatus for fusing the thermal plastic strip 5 at the mitered corners 7 to form the corner joint 8. The frame is held in place by "L"-shaped braces or corner holding members 14 at each corner. Each brace 14 is attached to a guide 11 that mates with and slides in a track 10 mounted on a table top or floor 17. The braces 14, each comprising a pair of walls adapted for embracing one corner of the frame being made, can be adjusted lengthwise of the track 10 according to the size of the frame being constructed. The ultrasonic or heat unit 13 is used to fuse the said plastic strip 5 at the mitered and fused corner joints 8. The contact point of the ultrasonic or heater unit 13 is carried on a shaft 12 that extends downwardly out of the unit 13.

The guide 11 and track 10 system can be of the common type which is capable of two functions. First, each guide 11 slides freely in the track 10 for the purpose of adjusting the brace 14 to different selected positions for different size frames. Secondly the guide 11 can be spring biased or locked by any suitable clamping means in selected positions along the track while producing compressive forces to frame sections 6A of the frame 6. This will allow the mitered plastic corner joints 8 to be fused by the ultrasonic or heat unit 13, preferably while the adjacent abutting frame sections 6A are all maintained in proper positions to form the frame 6 while slightly under compression by the braces 14, so the mitered corners will fit as tightly as possible and the adjacent frame sections or members 6A are maintained in pressure bearing relationship, and the corner joints 8 can be formed simultaneously by using multiple heater units 13.

Preferably, the track 10 used to retain the guide 11, is mounted in a table. Preferably the track 10 is recessed in the table top 17 so that the picture frame 6 lies flush on the table top while in the braces 14. Also, preferably a spring or other biasing means is provided in the tracks 10 tending to bias the braces 14 toward the center 16 of the tracks 10 thereby to help maintain the abutting adjacent frame sections 6A in compression.

It will be understood that while the heater unit 13 is fusing the plastic corner joints 8 it can also fuse a thermoplastic dust cover 9 to the plastic corner joints 8 being formed; and if desired, the dust cover 9 can thereafter be sealed to the entire continuous thermoplastic strips 5 thus formed around the back of the frame. Or, the dust cover 9 can be sealed to the thermoplastic strips 5 after the plastic corner joints 8 are completed.

Figure 3A:
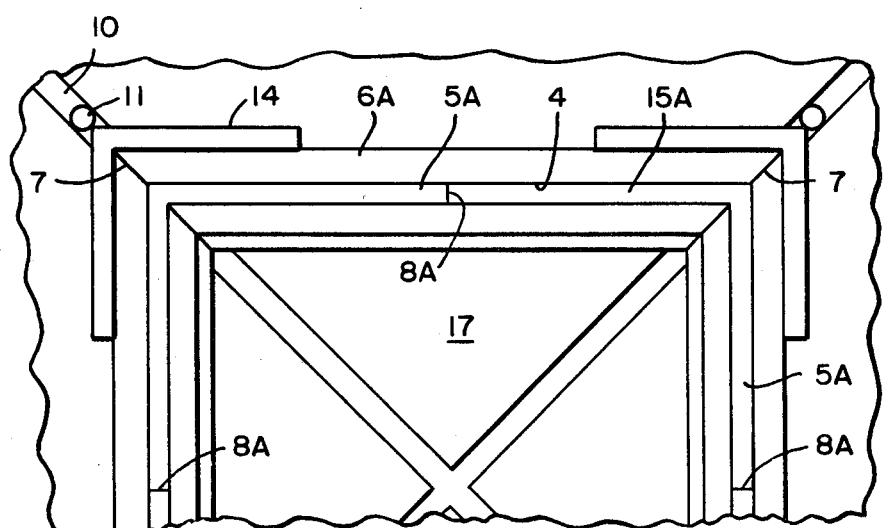
FIG. 3a is an alternative enlarged fractional plan view of the back of the picture frame shown in FIG. 3.

While the embodiment in FIGS. 1-3, 4 and 5 above described of my invention is the preferred embodiment, the following is an alternative construction described with reference to FIG. 3A. In lieu of the continuous plastic inner frame 15 formed by the fusing the plastic strips 5 at the corners, a right angular partial strip 5A which extends halfway along the frame members 6A into the grooves 4 of the abutting adjacent frame members 6A. The right angular strip 5A is inserted in each groove 4 of abutting adjacent frame members 6A as each corner is formed. After the frame is completely formed at all four corners with the right angular strips 5A inserted, the four corner braces 14 retain the frame in position while ultrasonic heat is applied at the abutted end 8A of right annular strips 5A, thereby to bond the strips 5A together to form a continuous thermoplastic inner frame 15A.

It will be understood that, according to my method of making a picture frame, the thermoplastic or thermoplastic impregnated dust cover 9 may be best sealed around the back of the frame 6 after the frame 6 is bonded together at the corners and the glass G and/or picture P and/or filler F have been received in the bonded together frame 6. The bonding of the dust cover 9 to the frame may be a part of or separate from the method making a frame regardless of using the method of bonding the corners of the frame 6.

If the fusible dust cover or backing material 9 is of sufficient strength and rigidity in relation to the weight of the frame 6, then the dust cover or backing material 9 when bonded to the back of the frame members 6A will maintain the frame members 6A in adjacent picture framing position forming a frame 6 without the necessity of any bonding to the adjacent frame members 6A at the corners or midway. In this regard, it is particularly desirable if the backing material 9 is shrinkable thermoplastic material so that it will tend to maintain the adjacent corner edges of the frame members 6A in tight abutting relationship after the backing material 9 has been bonded thereto and shrunk. For example heat shrinkable polyurethanes, polypropalenes or polyacrylic could be used for such backing materials.

It will be understood that when the backing material 9 is used to provide the holding force to maintain the adjacent corner edge of the frame members 6A in tight abutting relationship, that it would not be necessary for the thermal strips 5 or 5A to extend continuously around the groove 4, but could be smaller spaced strips along the groove 4.

The invention has been described in detail with particular reference to the preferred embodiments thereof, but it will be understood that variations and modifications can be effected within the spirit and scope of the invention as described hereinabove and as defined in the appended claims.

I claim:
1. In a method of making frames from a plurality of frame sections comprising:
 (a) providing a length of frame section;
 (b) forming a groove in a surface of said length of frame section and inserting a fusible strip into said groove;
 (c) cutting said molding across said fusible strip into a plurality of sections that mate together at corners to form a frame;
 (d) abutting said sections at said corners of the frame; and
 (e) fusing the abutting ends of said fusible strip together at said corners, whereby said sections of molding are held together to form a frame.
2. In a method of making frames from a plurality of frame sections comprising:
 (a) providing a plurality of frame sections;
 (b) forming a groove along the length of a surface of each of said frame sections;
 (c) forming a continuous plastic strip extending across adjacent edges of said adjacent frame sections and into and along the length of said adjacent sections into said groove and forming a continuous bonded plastic strip in said groove;
 (d) said continuous plastic strip being formed by maintaining said adjacent frame sections in pressure bearing relationship and bonding sections of said plastic strips so said adjacent frame sections are held together to form a frame.
3. In a method of making frames from a plurality of frame sections comprising:

(a) providing plastic bonding material extending along adjacent sections of said frame to be made;
(b) maintaining said adjacent sections in pressure bearing relationship; and
(c) bonding a backing material to said plastic material, said backing material having sufficient rigidity and strength to maintain sections of a frame to be made in selected framing positions when bonded thereto and while said backing material extends between said sections.

4. In a method of making frames from a plurality of frame sections comprising:
(a) providing fusible bonding material extending between adjacent sections of said frame to be made;
(b) maintaining said adjacent sections in pressure bearing relationship; and
(c) fusing said fusible material thereby to bond said adjacent sections together to form a frame; and
(d) bonding a backing material having sufficient rigidity and strength to maintain sections of said frame to be made in selected framing positions when bonded thereto, to the back of said sections of said frame while said backing material extends between said sections.

5. In a method of making frames from a plurality of frame sections comprising:
(a) providing fusible bonding material extending between adjacent sections of said frame to be made;
(b) maintaining said adjacent sections in pressure bearing relationship;
(c) fusing said fusible material thereby to bond said adjacent sections together to form a frame; and
(d) fusing a fusible backing material to the back of sections of said frame to be made while said backing material extends between said sections.

6. In a method of making frames from a plurality of frame sections comprising:
(a) providing fusible bonding material extending between adjacent sections of said frame to be made;
(b) maintaining said adjacent sections in pressure bearing relationship;
(c) fusing said fusible material thereby to bond said adjacent sections together to form a frame; and
(d) fusing a fusible backing material to the back of sections of said frame to be made while said backing material extends between said sections, thereby fusing said fusible backing to said continuous fused strip.

7. A method for making picture frames comprising:
(a) providing a length of molding with at least one plastic strip along the length of the molding;
(b) cutting said molding across said plastic strip into a plurality of sections that mate together at corners to form a frame;
(c) abutting said sections at said corners of the frame; and
(d) bonding the abutting ends of said plastic strip together at said corners, whereby said sections of molding are held together to form a frame.

8. The method according to claim 7 where in said providing step comprises forming a groove along a surface of a length of molding and inserting a plastic strip into said groove.

9. The method according to claim 8 wherein said forming step comprises forming said groove with at least a portion in cross-section thereof having a greater width than the width of an opening said groove makes in the back surface of said molding, whereby said plastic strip cannot be removed transversely from said molding.

10. The method according to claim 9 wherein said forming step comprises cutting said groove.

11. The method according to claim 10 wherein said molding is at least primarily wood.

12. The method according to claim 11 wherein said plastic strip is a thermoplastic material capable of being welded together by ultrasonic welding.

13. The method according to claim 7 wherein said abutting step comprises placing cut ends of said sections in contact such that the plastic strip of one section is in contact with the plastic strip of the contacting section.

14. The method according to claim 13 wherein said bonding step comprises applying ultrasonic energy to the adjacent thermoplastic strips sufficient to ultrasonically weld such strips together.

15. The method according to claim 14 wherein said abutting step comprises forming said sections into an enclosed picture frame.

16. The method according to claim 7 wherein said molding is wood and said providing step comprises cutting a groove in the rear surface of a length of molding and inserting a plastic strip into said groove.

17. The method according to claim 7 wherein said bonding step comprises heating said abutting sections of said plastic strip sufficient to weld said abutting sections together.

18. The method according to claim 7 wherein said abutting step comprises abutting all of said corners simultaneously.

19. The method according to claim 18 wherein said bonding step comprises fusing all of said abutting sections simultaneously.

20. The method according to claim 7 wherein said plastic strip is fusible by ultrasonic energy and wherein said bonding comprises applying ultrasonic energy to said sections of fusible strips.

21. The method according to claim 7 wherein said abutting comprises placing said sections on a table inside of movable frame locating members, forming said sections into a frame, and moving said movable frame locating members into contact with said sections to hold them in place during said bonding step.

22. The method according to claim 7 including attaching a picture to said frame such that said picture is enclosed and held in said frame.

23. A picture frame comprising a plurality of sections of molding matingly abutted together at corners to form a frame, each of said sections of said molding having a plastic strip running the length of the molding section and being substantially abutted with the plastic strip of the abutting molding section at each corner of said frame, and said substantially abutting plastic strips being bonded together at said corners, whereby said sections of molding are held together by said bonded plastic strips at said corners to form said frame.

24. The article according to claim 23 wherein said molding is primarily wood.

25. The frame according to claim 23 wherein the back surface of said molding has a groove the entire length thereof and wherein said plastic strip runs the entire length of said groove and is located in said groove.

26. The frame according to claim 25 wherein said plastic strip is key shaped in cross-section and has a width wider than the width of an opening said groove makes in the back surface of said molding, whereby said plastic strip cannot be removed transversely from said groove.

27. The frame according to claim 23 wherein said molding is primarily wood and said strips are made of thermoplastic material ultrasonically weldable together.

28. The frame according to claim 23 wherein said sections of molding are formed into an enclosed frame.

29. The frame according to claim 23 including a picture enclosed and held within said frame.

30. The frame according to claim 23 wherein there are four said sections and said frame comprises a rectangle and wherein the corners are 90° corners.

31. The frame according to claim 23 wherein each end of each of said sections is mitered.

* * * * *